(12) United States Patent
Ling

(10) Patent No.: US 9,363,689 B2
(45) Date of Patent: Jun. 7, 2016

(54) COORDINATED ACCESS AND BACKHAUL NETWORKS

(71) Applicant: MaxLinear, Inc., Carlsbad, CA (US)

(72) Inventor: Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 129 days.

(21) Appl. No.: 14/244,875

(22) Filed: Apr. 3, 2014

(65) Prior Publication Data

US 2014/0313914 A1    Oct. 23, 2014

Related U.S. Application Data

(60) Provisional application No. 61/807,829, filed on Apr. 3, 2013, provisional application No. 61/921,608, filed on Dec. 30, 2013.

(51) Int. Cl.
    *H04W 24/02* (2009.01)
    *H04B 7/155* (2006.01)
    *H04W 88/08* (2009.01)
    *H04W 92/12* (2009.01)

(52) U.S. Cl.
    CPC ........... *H04W 24/02* (2013.01); *H04B 7/15528* (2013.01); *H04W 88/085* (2013.01); *H04W 92/12* (2013.01); *Y02B 60/50* (2013.01)

(58) Field of Classification Search
    None
    See application file for complete search history.

(56) References Cited

U.S. PATENT DOCUMENTS

| | | | |
|---|---|---|---|
| 4,675,880 A | 6/1987 | Davarian | |
| 6,005,640 A | 12/1999 | Strolle | |
| 7,620,112 B2 | 11/2009 | Tang | |
| 8,416,836 B2 | 4/2013 | Kirshenbaum | |
| 8,989,762 B1 | 3/2015 | Negus | |
| 2003/0032424 A1 | 2/2003 | Judd | |
| 2005/0136980 A1 | 6/2005 | Kim | |
| 2007/0147485 A1 | 6/2007 | Sakamoto | |
| 2008/0233879 A1 | 9/2008 | Sasaki | |
| 2008/0274732 A1 | 11/2008 | Boutigny | |
| 2009/0023462 A1 | 1/2009 | Dent | |
| 2009/0207945 A1 | 8/2009 | Sasaki | |
| 2010/0240327 A1 | 9/2010 | Lambrecht | |
| 2011/0235568 A1* | 9/2011 | Esteves | H04B 7/15507 370/315 |
| 2012/0155887 A1 | 6/2012 | Youn | |
| 2012/0207048 A1 | 8/2012 | Kim | |
| 2013/0089042 A1 | 4/2013 | Negus | |
| 2013/0128896 A1* | 5/2013 | Munoz | H04L 49/9078 370/412 |
| 2013/0229309 A1 | 9/2013 | Thomas | |
| 2014/0031072 A1 | 1/2014 | Koorapaty | |
| 2015/0188584 A1 | 7/2015 | Laurent-Michel | |
| 2015/0215854 A1 | 7/2015 | Ling | |
| 2015/0230105 A1 | 8/2015 | Negus | |

* cited by examiner

*Primary Examiner* — Hoon J Chung
(74) *Attorney, Agent, or Firm* — McAndrews, Held & Malloy, Ltd.

(57) ABSTRACT

A communications network comprises performance determination circuitry and link control circuitry. The performance determination circuitry is operable to determine performance of a microwave backhaul link between a first microwave backhaul transceiver and a second microwave backhaul transceiver. The microwave backhaul link backhauls traffic of a mobile access link. The link control circuitry is operable to, in response to an indication from the performance determination circuitry that the performance of the microwave backhaul link has degraded, adjust one or more signaling parameters used for the mobile access link. The link control circuitry is operable to, in response to the indication that the performance of the microwave backhaul link has degraded, adjust one or more signaling parameters used for the backhaul link in combination with the adjustment of the parameter(s) of the access link.

17 Claims, 12 Drawing Sheets

COORDINATED ACCESS AND BACKHAUL NETWORKS

PRIORITY CLAIM

This application claims priority to the following application(s), each of which is hereby incorporated herein by reference:

U.S. provisional patent application 61/807,829 titled "Adaptive Wireless Backhaul Link" filed on Apr. 3, 2013; and U.S. provisional patent application 61/921,608 titled "Coordinated Access and Backhaul Networks" filed on Dec. 30, 2013

BACKGROUND

Conventional microwave backhaul links suffer from high cost, high power consumption, and performance that is highly dependent on environmental conditions. Limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Systems and methods are provided for coordinated access and backhaul networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
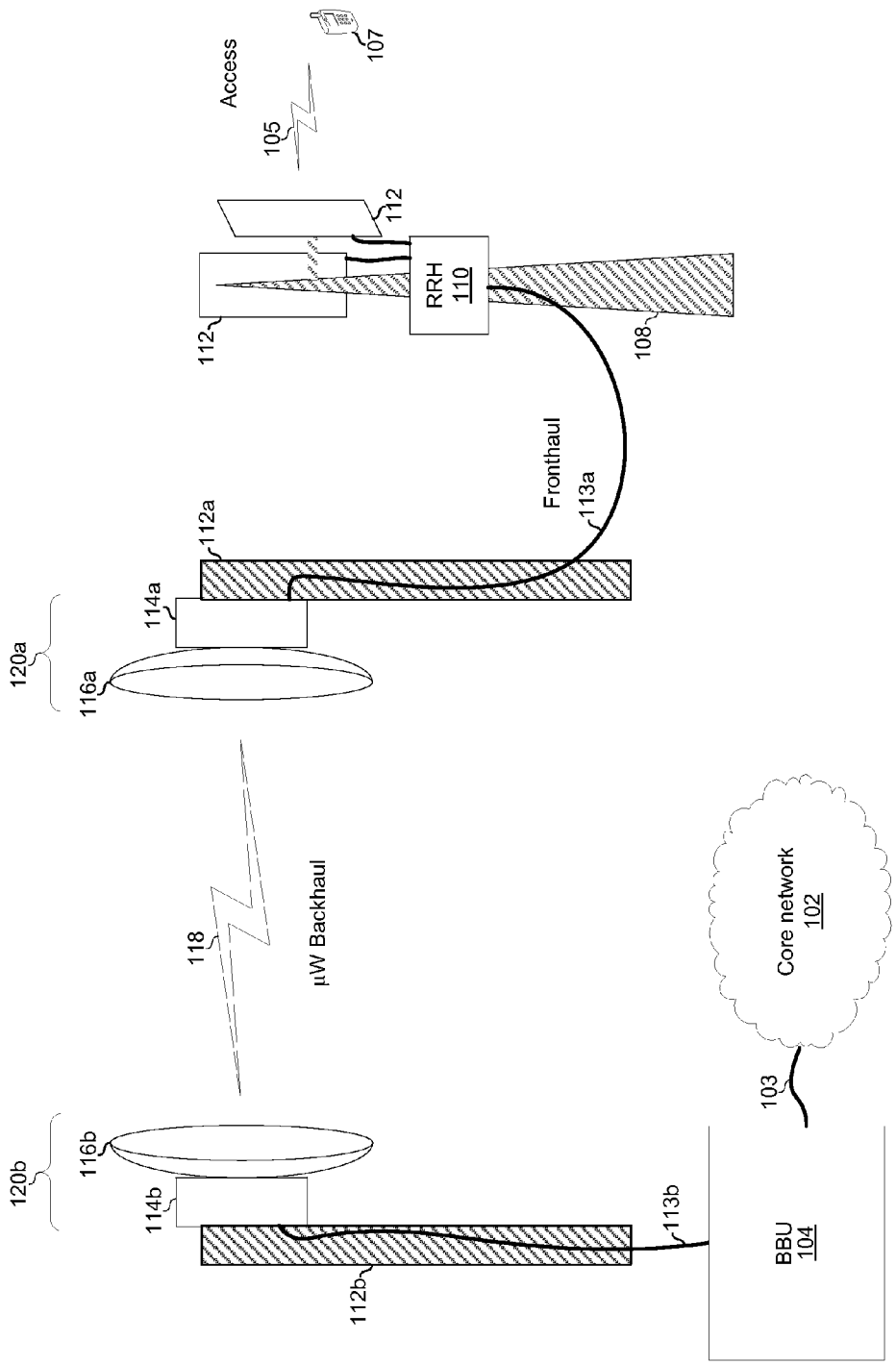
FIG. 1A is a diagram illustrating backhaul of an access network link over a wireless microwave backhaul link.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting. As used herein, "microwave" frequencies range from approximately 300 MHz to 300 GHz and "millimeter wave" frequencies range from approximately 30 GHz to 300 GHz. Thus, the "microwave" band includes the "millimeter wave" band.

In accordance with aspects of this disclosure, data from an access network may be communicated ("backhauled") over a wireless microwave link. Conventionally, signaling parameters (e.g., transmit power, receive sensitivity, sample rate, sample resolution, symbol rate, modulation type, modulation order, FEC type, FEC code rate, interleaver depth, and/or the like) of the access network communications being backhauled over the wireless microwave backhaul link are configured without regard to conditions on the microwave link and are configured to perform reliably in particular "corner cases" (i.e., extremes for various conditions) set forth in the applicable standards (e.g., cellular, WiMax, Wi-Fi, and/or other access network standards). Such corner cases for the access network communications may correspond to different conditions than the corner cases for the wireless microwave backhaul link. For example, a corner case for a wireless microwave backhaul link may correspond to conditions of high atmospheric attenuation (e.g., heavy rain, snow, smog, fog, etc.) whereas an access network link may be relatively impervious to atmospheric conditions due to communications of the access network being at much lower frequencies. Accordingly, aspects of this disclosure take advantage of the fact that, in conditions where the microwave backhaul link has little or no link margin, the access network may still have link margin (or vice versa). In such instances, signaling parameters used for the microwave backhaul link may be adjusted to reduce the data rate of the microwave backhaul link (e.g., by lowering sampling resolution, lowering sampling rate, decreasing FEC code rate, and/or the like) in reliance on the fact that the excess link margin in the access network link is great enough that the overall link margin (e.g., between the access terminal and the baseband unit) is sufficient to achieve performance requirements. In other words, the system may perform coordinated configuration of the access network link and the microwave backhaul link to maintain overall link margin (comprised of margin of the access network link plus margin of the backhaul link) within determined limits. A lower limit of the overall link margin may, for example, be determined based on minimum required throughput, latency, and/or the like. An upper limit of the overall link margin may, for example, be determined based on power consumption targets.

FIG. 1A is a diagram illustrating backhaul of an access network link over a wireless microwave backhaul link. Shown are a tower 108 to which access network antennas 112 and remote radio head (RRH) 110 are attached, a baseband unit 104, a tower 112a to which microwave backhaul node 120a (comprising transceiver 114a and antenna 116a) is attached, and a tower 112b to which microwave backhaul node 120b (comprising transceiver 114b and antenna 116b) is attached. Also shown is an access network terminal 107.

The access network terminal 107 may be, for example, a smartphone, laptop, tablet computer, set-top-box, and/or the like. The access network terminal 107 is configured for communicating over link 105 between it and the antennas 112. The access network (to which link 105 belongs) may be, for example, a mobile access network or a wired or optical access network. Examples of a mobile access network include cellular (e.g., 4G LTE), Wi-Max, and Wi-Fi. Examples of a wired or optical access network include data over cable service interfaced specification (DOCSIS), digital subscriber line (DSL), and/or the like.

The antennas 112 are configured for radiating and capturing signals of the access network. The captured signals are conveyed to the RRH 110 and the radiated signals are received from the RRH 110.

Uplink Traffic

For uplink traffic from the terminal 107 to the core network 102, the terminal 107 transmits a signal onto link 105. The signal on the link 105 is captured by an antenna 112 and conveyed to the RRH 110. The RRH 110 processes (e.g., amplifies, downconverts, filters, and/or the like) the signals received from the antennas 112 and transmits the resulting access network signal to the microwave backhaul transceiver 114a via link 113a (which is shown as a wired or optical fiber link, but which may also be or include a wireless link).

The microwave backhaul transceiver 114a processes, as necessary (e.g., packetizes, encodes, modulates, upconverts, beamforms, amplifies, and/or the like) the access network signal received from the RRH 110 for transmitting the access network signal over the microwave backhaul link 118. In an example implementation, the access network signal output by the RRH 110 may be an analog signal (i.e., the RRH 110 performs analog-domain processing up to, but not including, analog-to-digital conversion) which the microwave transceiver may digitize prior to sending over the backhaul link. The digitization of the access network signal from the RRH 110 may, for example, be in accordance with the common public radio interface (CPRI) standard. That is, the microwave backhaul transceiver 114a may perform transmit-side CPRI processing of the access network signal. In another example implementation, the digitization (e.g., transmit-side CPRI processing) of the access network signal may be performed in the RRH 110 prior to sending it to the microwave backhaul transceiver 114.

The microwave transceiver 114b receives the microwave signal over microwave backhaul link 118, processes the signal as necessary (e.g., downconverts, filters, beamforms, and/or the like) for conveyance to the BBU 104 via link 113b (shown as wired or optical fiber but which may be wireless). The processing may recover the access network signal output by the RRH 110. In this manner, the existence of the microwave backhaul link 118 between the RRH 110 and the BBU 104 may be transparent to the RRH 110 and BBU 104. In an example implementation, processing of the received signal by the microwave transceiver 114b may include receive-side CPRI processing.

The BBU 104 receives the signal via link 113 and demodulates the access network signal to recover data which is then conveyed to the core network 102 via link 103 (which is shown as a wired or optical fiber link, but which may also be or include a wireless link).

Downlink Traffic

For downlink traffic, the BBU 104 receives data from the core network 102 via the link 103. The BBU 104 then modulates the data onto a signal in accordance with the access network standard/protocols in use, resulting in an access network signal. In an example implementation, the access network signal is output onto link 113b.

The microwave backhaul transceiver 114b processes, as necessary (e.g., packetizes, encodes, modulates, upconverts, beamforms, amplifies, and/or the like) the access network signal received from the BBU 104 for transmitting the signal over the microwave backhaul link 118. In an example implementation, the access network signal is an analog signal (i.e., the BBU 104 converts the signal to analog and outputs it the same as if outputting the signal directly to the RRH 110). In such an implementation, the microwave transceiver 114b may digitize the signal prior to sending it over the backhaul link. The digitization of the access network signal may, for example, be in accordance with the common public radio interface (CPRI) standard. That is, the microwave backhaul transceiver 114b may perform transmit-side CPRI processing of the access network signal. In another example implementation, the digitization (e.g., transmit-side CPRI processing) may be performed in the BBU 104 prior to the access network signal being sent over the link 113b.

The microwave transceiver 114a receives the microwave signal over microwave backhaul link 118, processes the signal as necessary (e.g., downconverts, filters, beamforms, and/or the like) for conveyance to the RRH 110 via link 113a. The processing may recover the access network signal output by the BBU 104. In this manner, the existence of the microwave backhaul link 118 between the RRH 110 and the BBU 104 may be transparent to the RRH 110 and BBU 104. In an example implementation, processing of the received signal by the microwave transceiver 114a may include receive-side CPRI processing.

The RRH 110 receives the access network signal via the link 113a, processes it as necessary (e.g., upconverts and amplifies it) for transmission onto the access network link 105.

Figure 1B:
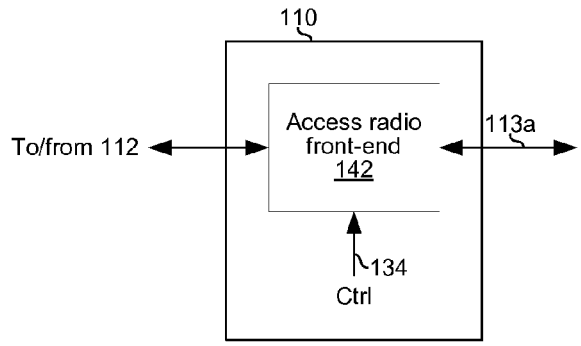
FIG. 1B depicts an example implementation of the remote radio head of FIG. 1A.

FIG. 1B depicts an example implementation of the remote radio head of FIG. 1A. The example RRH 110 comprises an access network front-end circuit 142 that converts between RF access network signals on antennas 112 and baseband access network signals on link 113a. Various signaling parameters used by the circuit 142 may be controlled based on control data 134 which may originate from the microwave transceiver(s) 114a and/or 114b and which may be conveyed to the RRH 110 via the link 113*a*. The control data may be communicated in-band with the access network signal on link 113 or out-of-band with the access network signal (e.g., at different times, on different frequency, etc.).

Figure 1C:
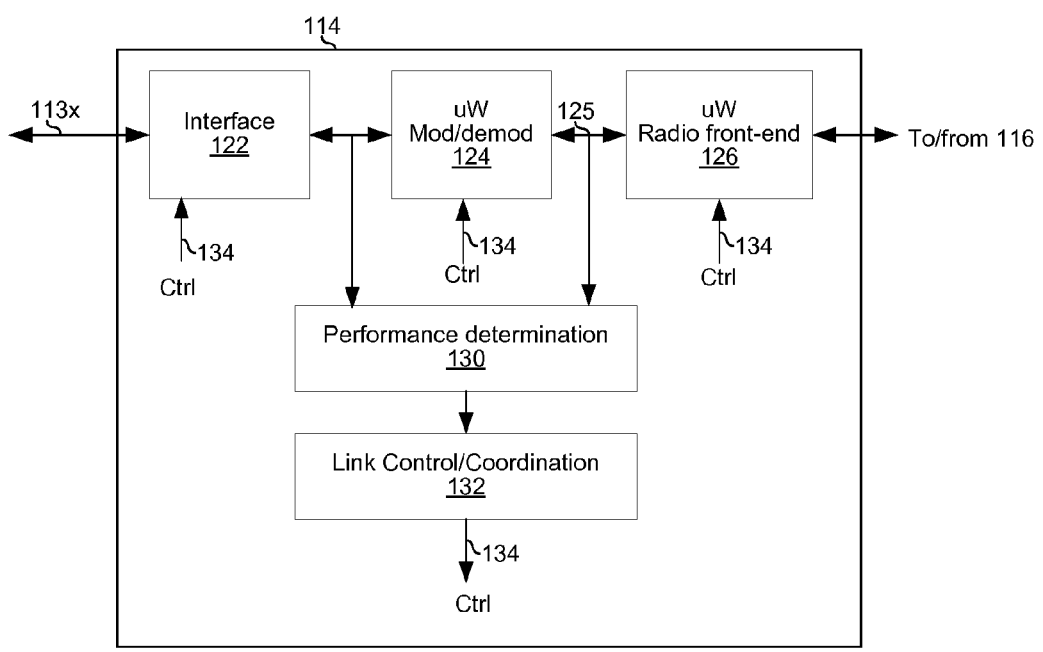
FIG. 1C depicts an example implementation of the microwave backhaul transceivers of FIG. 1A.

FIG. 1C depicts an example implementation of the microwave backhaul transceivers of FIG. 1A. The example microwave backhaul transceiver 114$_X$ (which is representative transceivers 114*a* and 114*b*) comprises interface circuit 122, modulator/demodulator (Mod/demod) circuit 124, microwave radio front-end 126, performance determination circuit 130, and link control/coordination circuit 132.

The interface circuit 122 is operable to interface the link 113$_X$ (which is representative of links 113*a* and 113*b*) and the modulator/demodulator circuit 124. For an incoming access network signal from the link 113$_X$, interface circuit 122 processes the access network signal to make it suitable for the circuit 124 to process it (e.g., encode, map, interleave, and/or the like) for transmission onto the microwave backhaul link. For example, the interface 122 may perform transmit-side CPRI functions. For an incoming microwave backhaul signal from the link 118, interface circuit 122 processes the demodulated signal from the circuit 124 to make it suitable for transmission onto the link 113$_X$. For example, the interface 122 may perform receive-size CPRI functions. Various parameters used by the interface circuit 122 (e.g., sampling rate and/or sampling resolution) may be controlled based on control data 134 which may originate from the link control/coordination circuit 132 and which may be based on the performance of the microwave backhaul link determined by the circuit 130.

The modulator/demodulator circuit 124 is operable to perform modulation and demodulation functions (e.g., encoding, decoding, symbol mapping, symbol demapping, interleaving, deinterleaving, and/or the like) in accordance with whatever standards and/or protocols are in use on the microwave backhaul link(s) 118. In an example implementation, the modulation type (e.g., QAM, PSK, FSK, etc.), order, FEC encoding type (e.g., Reed-Solomon, LDPC, etc.), FEC code rate, interleaver depth, and/or other parameters of the modulator/demodulator circuit 124 may be controlled via a control signal 134 output by link control circuit 130. In an example implementation, various components of the modulator/demodulator circuit 124 may be enabled and disabled via the control signal 134.

The microwave radio front-end 126 is operable to perform data conversion (e.g., analog-to-digital (ADC) and digital-to-analog (DAC)) and analog-domain signal processing functions (e.g., filtering, upconversion, downconversion, and amplification) for interfacing to antenna 116. In an example implementation, filter frequencies, local oscillator frequencies, gain settings (e.g., of a power amplifier of front-end 126), ADC resolution, DAC resolution, and/or other parameters of the front-end circuit 126 may be controlled via the control signal 134 output by link control circuit 132.

The performance determination circuit 130 is operable to determine one or more performance metrics of the microwave backhaul link 118 and/or determine environmental conditions (e.g., temperature, twist and sway due to wind, atmospheric attenuation, and/or the like), which may impact performance of the microwave link 118. The performance determination circuit 130 may be operable to determine the performance metrics and/or environmental conditions continually, periodically, and/or occasionally (e.g., in response to occurrence of determined events). Example performance metrics the performance determination circuit 130 may determine include signal-to-noise ratio (SNR), bit error rate (BER), packet error rate (PER), and/or symbol error rate (SER).

In an example implementation, the performance determination circuit 130 may be operable to determine atmospheric attenuation based on one or more measured performance metrics for the microwave backhaul link 118. In an example implementation, the performance determination circuit 130 may be operable to determine atmospheric attenuation and/or other environmental conditions based on data communicated with a network (e.g., data from a weather service which the performance determination circuit 130 may access via the interface 122 and the Internet). In an example implementation, the performance determination circuit 130 may comprise sensors and/or instrumentation for measuring atmospheric conditions and/or directly measuring atmospheric attenuation. Such instrumentation/sensors may comprise, for example, a hygrometer, a psychrometer, and/or a radiometer. In an example implementation, the performance determination circuit 130 may be able to predict future atmospheric attenuation (e.g., based on current and/or past measured atmospheric attenuation) and/or other environmental conditions and schedule configuration of parameters used by the circuit(s) 122, 124, 126, 142, and/or 120 in advance.

The link control circuit 132 is operable to jointly control signaling parameters used for the microwave backhaul link 118 and access network link 105 based on the current and/or predicted performance determined by the circuit 130. In this manner, overall link margin across the microwave backhaul link 118 and access network link 116 may be managed to achieve optimal combinations of capacity, latency, power savings, and/or other performance criteria. Furthermore, rather than the microwave backhaul link always being configured for worst-case conditions as is conventionally the case, the microwave transceivers 114*a* and 114*b* can burn more power to handle worst-case conditions which occur, for example, 0.0001% of the time, but also offer higher performance (e.g., higher reliability, higher throughput, lower latency, lower power consumption, and/or the like) the remaining 99.999% of the time.

Figure 1D:
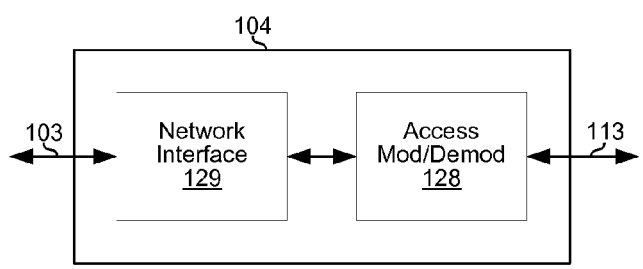
FIG. 1D depicts an example implementation of the baseband unit of FIG. 1A.

FIG. 1D depicts an example implementation of the baseband unit of FIG. 1A. The example BBU 104 comprises modulator/demodulator 128 and a network interface circuit 129. The modulator/demodulator 128 is operable to perform modulation and demodulation functions (e.g., encoding, decoding, symbol mapping, symbol demapping, interleaving, deinterleaving, and/or the like) in accordance with whatever standards are in use in the access network. The network interface circuit 122 is operable to send and receive signals in accordance with whatever standards or protocols are in use on the link 103 (e.g., Ethernet).

Figure 2:
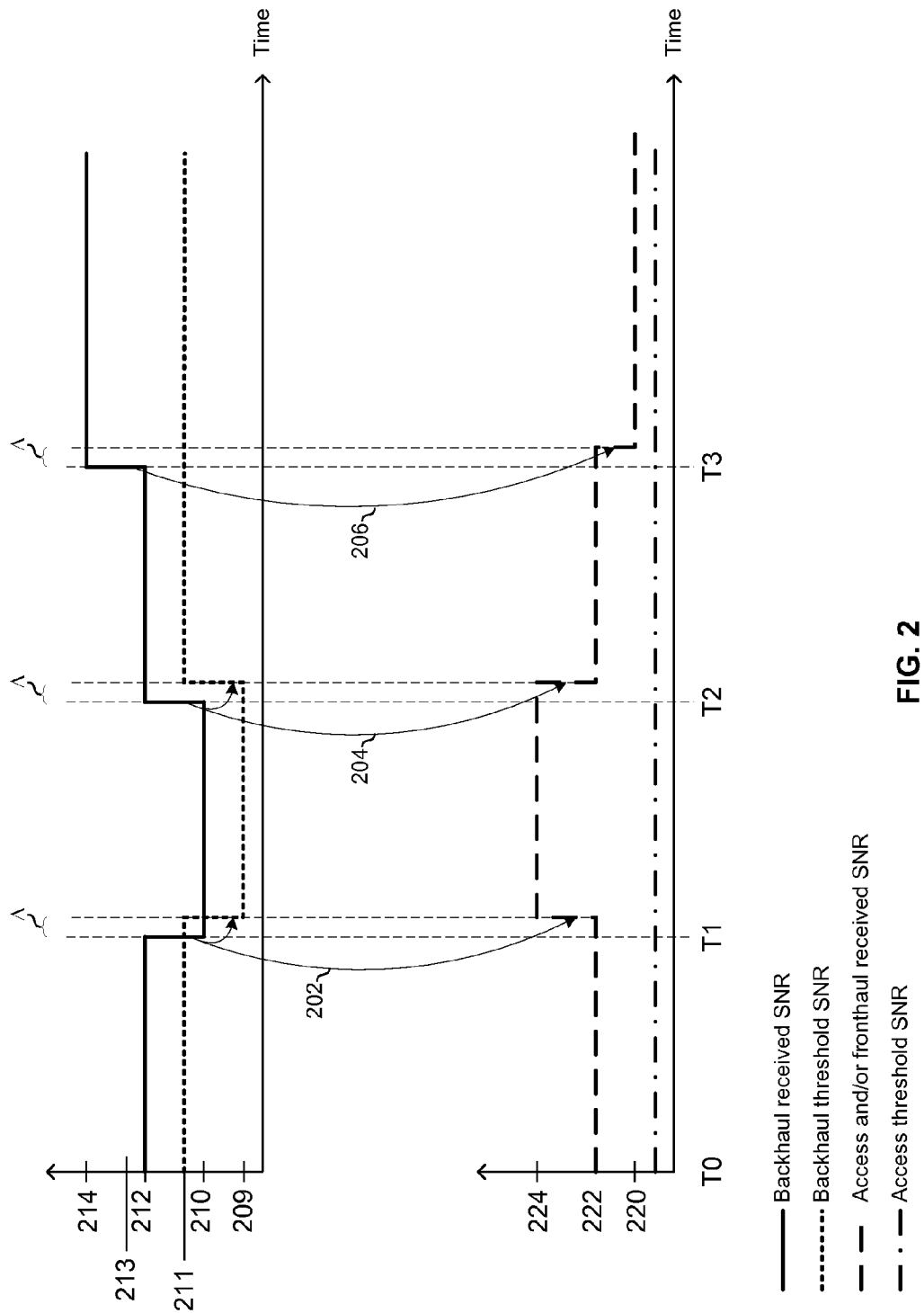
FIG. 2 depicts waveforms illustrating coordination of access, fronthaul, and backhaul networks.

FIG. 2 depicts waveforms illustrating coordination of access, fronthaul, and backhaul networks.

At time T1, signal to noise ratio (SNR) of the microwave backhaul link 118 degrades (e.g., as a result of increased atmospheric attenuation, or some other condition that impacts the microwave frequencies on which the link 118 operates) from a level 212 that is above the threshold SNR to a level 210 that is below the threshold SNR. In response to this degradation in performance of the microwave backhaul link 118, as indicated by arrow 202, one or more signaling parameters (e.g., transmit power, modulation order, sampling resolution, FEC code rate, etc.) used for the access link 105 are adjusted to increase the SNR of the access link 105, and one or more signaling parameters (e.g., transmit power, modulation order, sampling resolution, FEC code rate, etc.) of the backhaul link 118 are adjusted to decrease the threshold SNR of the microwave backhaul link from a level 211 to a level 209. This combination of adjustments to the signaling parameters of the access link 105 and the backhaul link 118 result in the overall link margin over the two links in series being maintained within desired limits. This may be possible because atmospheric attenuation, for example, may have a relatively large impact on microwave frequencies used for the backhaul link 118 but relatively little impact on frequencies used for the access link 105. Accordingly, from time T1+Δ to T2+Δ, one or more signaling parameters used for the access link 105 may be set to take advantage of favorable signal conditions on the access link 105 to compensate for the unfavorable signal conditions on the backhaul link 118.

At time T2, SNR of the microwave backhaul link 118 improves from the level 210 to the level 212. In response, as indicated by arrow 204, the signaling parameters of access network link 105 may revert to values corresponding to SNR level of 222 (e.g., resulting in further power savings in the access network), and the signaling parameters of the backhaul link 118 may revert to values corresponding to the SNR threshold of 211.

At time T3 SNR of the microwave backhaul link 118 improves from the level 212 to the level 214. In response, as indicated by arrow 206, the signaling parameters of access network link 105 may be changed to values corresponding to SNR level of 220 (e.g., resulting in further power savings in the access network).

Similarly, although not shown, the cause and response may apply in the other direction. That is, changes in the access link 105 may trigger adaptation of signaling parameters used for the backhaul link 118. For example, where the SNR of the access link 105 is low, signaling parameters used for the backhaul link 118 may be configured to increase link margin of the backhaul link 118 such that overall link margin (e.g., from terminal 107 to BBU 104) is maintained above a determined minimum threshold.

Although the above describes trading off power consumption vs. link margin of the access link 105 and backhaul link 118, the same can be applied to coordination among any two more of links 105, 113a, 118, and 113b. For example, signaling parameters used for the links 113a and/or 113b may be adjusted to reduce power consumption in instances that less link margin on the links 113a and 113b can be tolerated due to sufficient link margin on the link(s) 105 and/or 118.

Figure 3:
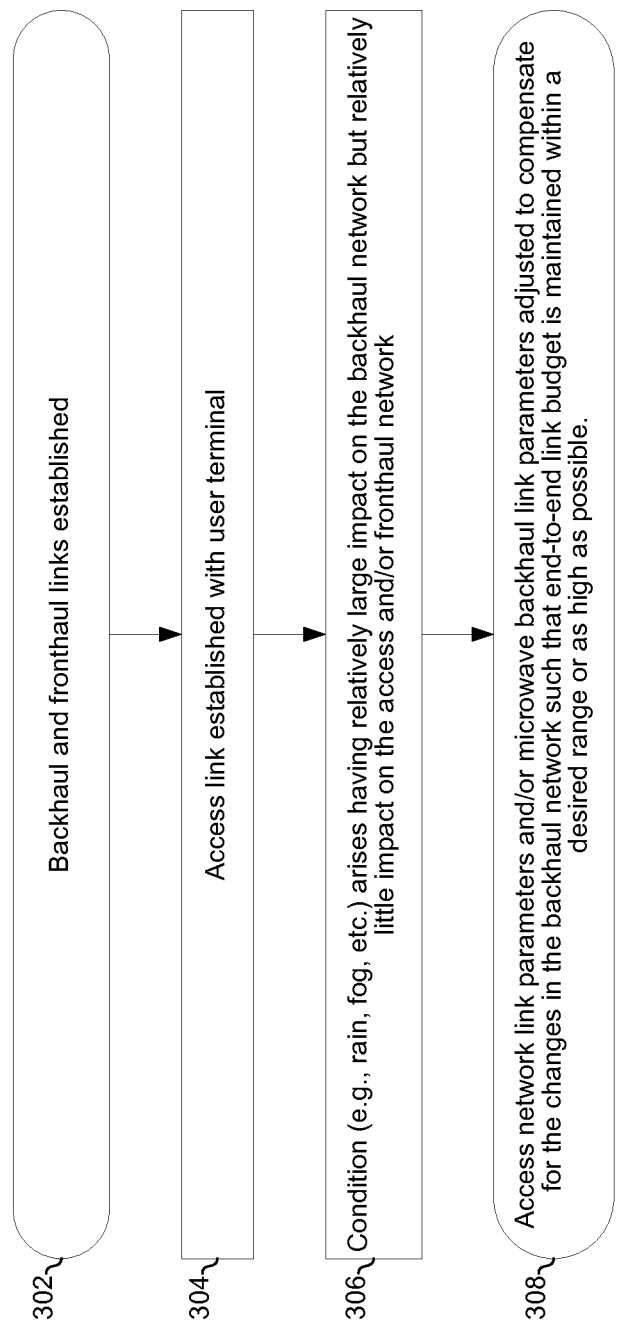
FIG. 3 is a flowchart illustrating an example process for coordination of access, fronthaul, and backhaul networks.

FIG. 3 is a flowchart illustrating an example process for coordination of access, fronthaul, and backhaul networks. In block 302, the components of the network are powered up and the links 118, 113a, and 113b are established. In block 304, access link 105 is established between terminal 107 to the RRH 110. In block 306, a condition, such as rain or fog, arises that significantly degrades performance of the microwave backhaul link 118 but has relatively little impact on the access link 105. In block 308, signaling parameters used for the access link 105 and/or signaling parameters used for the microwave backhaul link 118 are adjusted to compensate for the degraded performance of the backhaul link. For example, signaling parameters of the access link 105 may be adjusted to increase the SNR on the access link 105 while the number of bits per sample and the code rate (i.e., ratio of data bits to data bits+redundant bits) used for transmitting data over the microwave backhaul link 118 may each be decreased. As another example, where the SNR of the access link 105 is sufficiently high when the backhaul link 118 experiences a degradation in performance, the signaling parameters of the access link 105 may be adjusted to reduce the load on the backhaul link 118. For example, in response to degradation of the backhaul link 118, the number of bits per sample used on the access link 105 may be decreased. This may decrease the SNR on the access link (as a result of increased quantization noise) as a tradeoff for reducing the bit rate to a level that can be supported by the current conditions on the backhaul link 118. In this manner, performance may degrade gracefully rather than catastrophically.

Figure 4:
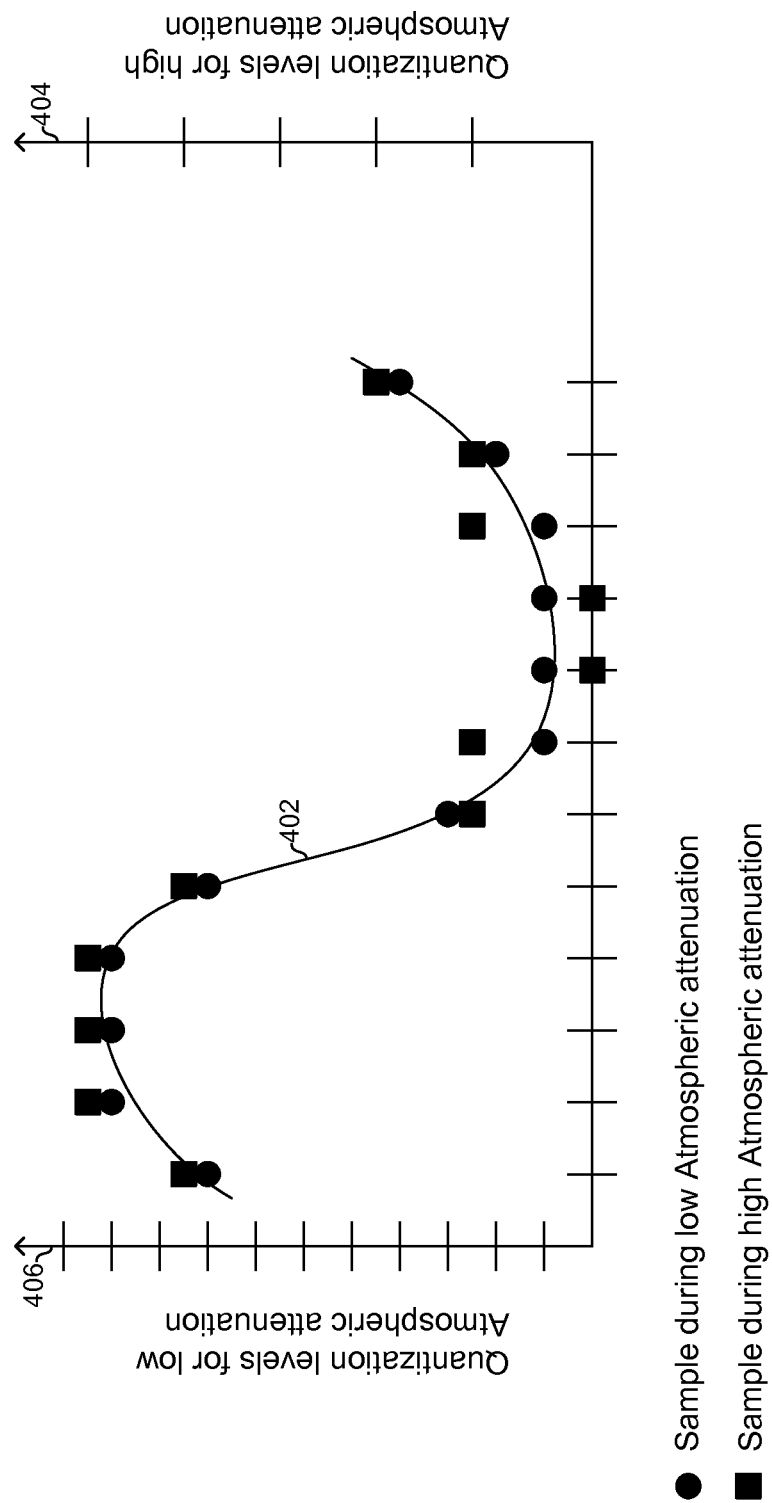
FIG. 4 depicts adaptively controlling digitization of an access network signal based on performance of a microwave link over which the signal is to be backhauled.

Shown in FIG. 4 is an example access network signal 402 received from RRH 110 and being digitized by circuit 122 for communication over the microwave backhaul link 118. The left axis 406 shows a larger number of quantization levels (corresponding to a higher number of bits per sample) used for quantizing the access network signal 402 when conditions are good for the microwave link (e.g., clear skies). The right axis 404 shows a smaller number of quantization levels (corresponding to a lower number of bits per sample) used for digitizing the access network signal 402 signal when conditions are poor on the microwave link (e.g., rain or fog). By controlling the number of bits per sample of the backhaul link in response to increased atmospheric attenuation and/or other conditions negatively impacting the link 118, the user experience (e.g., voice quality of a voice call in progress by the terminal 107) may be allowed to degrade continually rather than completely failing upon signal conditions falling below a threshold.

In accordance with an example implementation of this disclosure, a communications network comprises performance determination circuitry (e.g., 130) and link control circuitry (e.g., 132). The performance determination circuitry may be operable to determine performance of a microwave backhaul link (e.g., 118) between a first microwave backhaul transceiver (e.g., 114a) and a second microwave backhaul transceiver (e.g., 114b). The microwave backhaul link backhauls traffic of a mobile access link (e.g., link 105 of a cellular access network). The link control circuitry may be operable to, in response to an indication from the performance determination circuitry that the performance of the microwave backhaul link has degraded, adjust one or more signaling parameters used for the mobile access link (e.g., to increase SNR of the access link). The link control circuitry may be operable to, in response to an indication from the performance determination circuitry that the performance of the microwave backhaul link has improved, adjust the one or more parameters used for the mobile access link (e.g., to decrease SNR of the access link, allowing for reduced power consumption in the access network).

The determination of the performance may comprise a determination of atmospheric attenuation impacting the microwave backhaul link. The performance determination circuitry may be operable to determine the atmospheric attenuation based on data received from a weather service accessible via the communications network. The performance determination circuitry may be operable to determine the atmospheric attenuation based on direct measurement of the atmospheric attenuation by the circuitry of the communications network (e.g., via an integrated hygrometer, psychrometer, radiometer, and/or the like). The determination of the performance may comprise a determination of signal-to-noise ratio of the microwave backhaul link. The signaling parameters used for the mobile access link may comprise one or more of: power transmitted by a remote radio head (e.g., 110) that handles the mobile access link, order and/or type of modulation used for the mobile access link, and type and/or code rate of forward error correction used for the mobile access link.

The system may comprise interface circuitry (e.g., 122) and microwave backhaul transceiver circuitry (e.g., $114_x$). The interface circuitry may be operable to receive an analog mobile access link signal from the remote radio head. The interface circuitry may be operable to sample the mobile access link signal to generate a digitized mobile access link signal. The microwave backhaul transceiver circuitry may be operable to send the digitized mobile access link signal over the microwave backhaul link. The microwave backhaul transceiver circuitry may operable to receive the digitized mobile access link signal over the microwave backhaul link. The microwave backhaul transceiver circuitry may operable to convert the digitized mobile access link signal back to the analog mobile access link signal. The microwave backhaul transceiver circuitry may operable to convey the analog mobile access signal to a baseband unit, wherein the baseband unit is operable to demodulate the mobile access link signal. A sampling resolution and/or sampling rate used by the interface circuitry may be decreased in response to the indication from the performance determination circuitry that the performance of the microwave backhaul link has degraded. A sampling resolution and/or sampling rate used by the interface circuitry may be increased in response to the indication from the performance determination circuitry that the performance of the microwave backhaul link has improved.

FIGS. 5A-9B illustrate additional aspects of this disclosure.

Figure 5A:
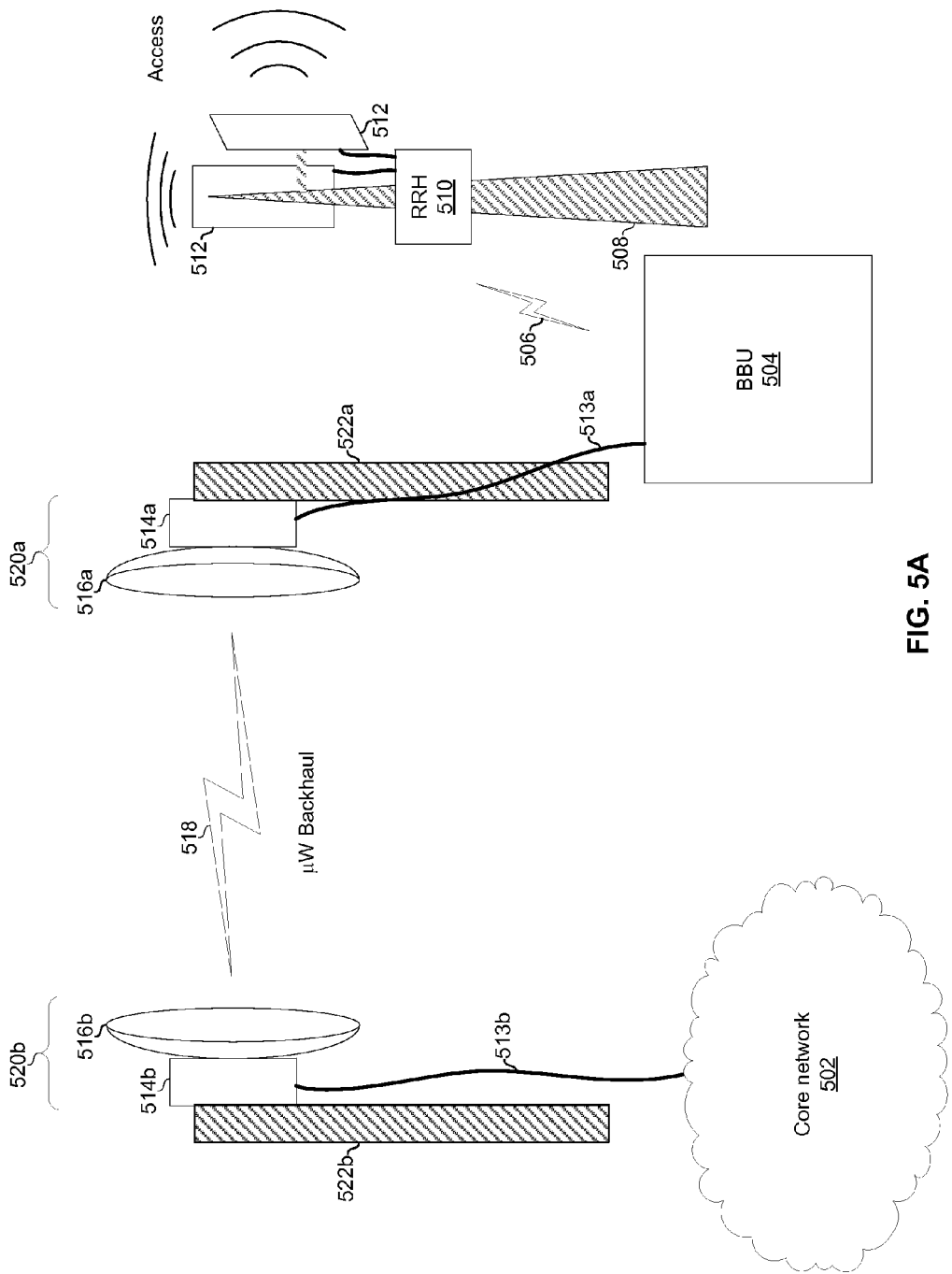
FIG. 5A depicts a portion of an example network comprising a pair of microwave backhaul nodes.

FIG. 5A is a diagram illustrating a portion of an example network comprising a pair of microwave backhaul nodes. Shown are a tower 508 to which access network antennas 512 and remote radio head (RRH) 510 are attached, a baseband unit 504, a tower 526A to which microwave backhaul node 520a (comprising transceiver 514a and reflector 516a) is attached, and a tower 526B to which microwave backhaul node 520b (comprising transceiver 514b and antenna 516b) is attached. At any particular time, there may be one or more active (i.e., carrying traffic or synchronized and ready to carry traffic after a link setup time that is below a determined threshold) links 506 (shown as wireless, but may be wired or optical) between the RRH 510 and the BBU 504. At any particular time, there may be one or more active backhaul links 518 between the pair of backhaul nodes 520a and 520b.

The antennas 512 are configured for radiating and capturing signals of an access network (e.g., 3G, 4G LTE, etc. signals to/from mobile handsets). Although the example pair of microwave nodes 520a and 520b are used for backhauling cellular traffic, this is just one example type of traffic which may be backhauled by microwave nodes, such as 520a and 520b, that implement aspects of this disclosure. Other example traffic types are described below with respect to FIGS. 9A and 9B.

For an uplink from a mobile handset to the core network 502, the antennas 512 receive signals from the handset and convey them to the RRH 510. The RRH 510 processes (e.g., amplifies, downconverts, digitizes, filters, and/or the like) the signals received from the antennas 512 and transmits the resulting signals (e.g., downconverted I/Q signals) to the baseband unit (BBU) 504 via link(s) 506. The BBU 504 processes, as necessary, (e.g., demodulates, packetizes, modulates, and/or the like) the signals received via link(s) 506 for conveyance to the microwave backhaul transceiver 514a via link 117A (shown as wired or optical, but may be wireless). The backhaul transceiver 514a processes, as necessary (e.g., upconverts, filters, beamforms, and/or the like), the signals from BBU 504 for transmission via the reflector 516a over microwave backhaul link(s) 518. The microwave transceiver 514b receives the microwave signals over microwave backhaul link(s) 518, processes the signals as necessary (e.g., downconverts, filters, beamforms, and/or the like) for conveyance to the cellular service provider core network 502 via link 117B.

For a downlink from the core network 502 to the mobile handset, data from the core network is conveyed to microwave backhaul transceiver 514b via link 117B. The transceiver 514b processes, as necessary (e.g., upconverts, filters, beamforms, and/or the like), the signals from the core network 502 for transmission via the reflector 516b over link(s) 518. Microwave transceiver 514a receives the microwave signals via the microwave backhaul link(s) 518, and processes the signals as necessary (e.g., downconverts, filters, beamforms, and/or the like) for conveyance to the BBU 504 via link 117A. The BBU 504 processes the signal from transceiver 514a as necessary (e.g., demodulates, packetizes, modulates, and/or the like) for conveyance to RRH 510 via link(s) 506. The RRH 510 processes, as necessary (e.g., upconverts, filters, amplifies, and/or the like), signals received via link 506 for transmission via an antenna 512.

Figure 5B:
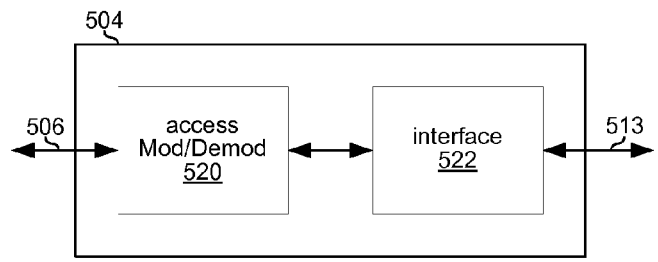
FIG. 5B depicts an example implementation of the baseband unit of FIG. 5A.

FIG. 5B depicts an example implementation of the baseband unit of FIG. 5A. The example BBU 504 comprises modulator/demodulator 128 and interface circuit 522. The modulator/demodulator 128 is operable to perform modulation and demodulation functions (e.g., encoding, decoding, symbol mapping, symbol demapping, interleaving, deinterleaving, and/or the like) in accordance with whatever cellular standards are in use in the access network. The interface circuit 522 is operable to send and receive signals in accordance with whatever standards or agreed-upon protocols are in use on the link 513 (which may correspond to 117A and/or 117B of FIG. 5A).

Figure 5C:
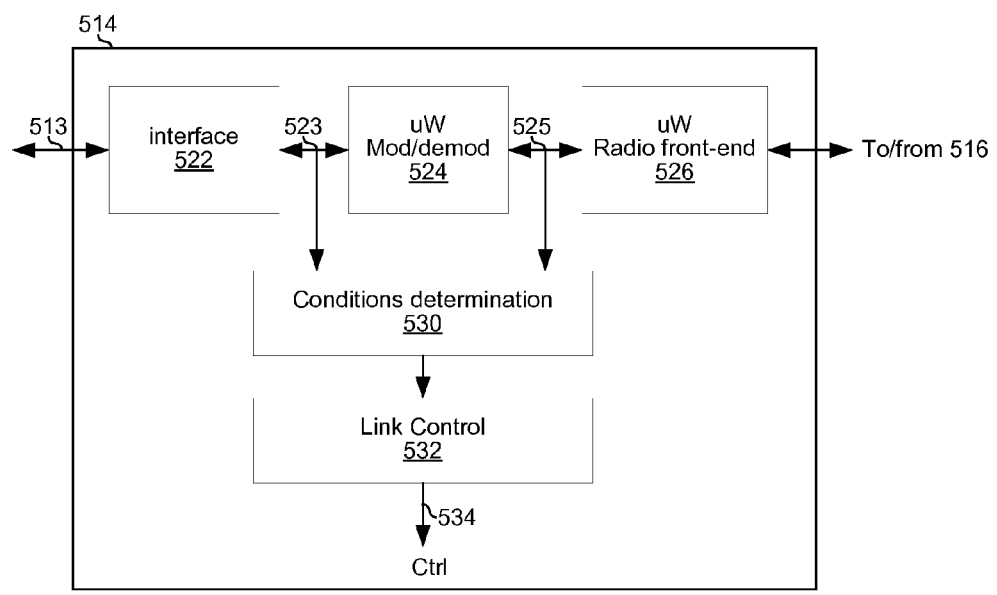
FIG. 5C depicts an example implementation of the microwave backhaul transceivers of FIG. 5A.

FIG. 5C depicts an example implementation of the microwave backhaul transceivers of FIG. 5A. The example microwave backhaul transceiver comprises interface circuit 522, modulator/demodulator 524, radio front-end 526, conditions determination circuit 530, and link control circuit 532.

The interface circuit 522 is operable to send and receive signals in accordance with whatever standards or agreed-upon protocols are in use on the link 513 (which may correspond to 117A and/or 117B of FIG. 5A).

The modulator/demodulator 524 is operable to perform modulation and demodulation functions (e.g., encoding, decoding, symbol mapping, symbol demapping, interleaving, deinterleaving, and/or the like) in accordance with whatever standards and/or agreed-upon protocols in use on the microwave backhaul link(s) 518. In an example implementation, the modulation type (e.g., QAM, PSK, FSK, etc.), order, FEC encoding type (e.g., Reed-Solomon, LDPC, etc.), FEC code rate, interleaver depth, and/or other parameters of the circuit 524 may be controlled via a control signal 534 output by link control circuit 530. In an example implementation, various components of the circuit 524 may be enabled and disabled via the control signal 534.

The radio front-end 526 is operable to perform data conversion (e.g., analog-to-digital (ADC) and digital-to-analog (DAC)) and analog-domain signal processing functions (e.g., filtering, upconversion, downconversion, and amplification) for interfacing to reflector 516. In an example implementation, filter frequencies, local oscillator frequencies, gain settings (e.g., of a power amplifier of front-end 526), ADC resolution, DAC resolution, and/or other parameters of the circuit 526 may be controlled via the control signal 534 output by link control circuit 532. In an example implementation, various components of the circuit 526 may be enabled and disabled via the control signal 534. For example, the circuit 526 may comprise multiple transmit and receive paths each of which may be individually controlled (e.g., as described below with reference to FIGS. 6A-6C.

The conditions determination circuit 530 is operable to determine atmospheric attenuation (due to gases and/or aerosols in the atmosphere) experienced by the microwave backhaul link(s) 518. The circuit 530 may determine the atmospheric attenuation continually, periodically, and/or occasionally (e.g., in response to occurrence of determined events). In an example implementation, the atmospheric attenuation may be determined based on measurement/characterization (e.g., in the form of one or more metrics such as signal-to-noise ratio (SNR), bit error rate (BER), packet error rate (PER), throughput, number of retransmissions, and/or the like) of data signals communicated over the link(s) 518. In an example implementation, the atmospheric attenuation may be determined based on measurement/characterization of test/calibration signals send over the link(s) 518. In an example implementation, the atmospheric attenuation may be determined based on data communicated with a network (e.g., data from a weather service which the conditions determination circuit 530 may access via the interface 522). In an example implementation, the circuit 530 may comprise sensors and/or instrumentation for measuring atmospheric conditions and/or directly measuring atmospheric attenuation. Such instrumentation/sensors may comprise, for example, a hygrometer, a psychrometer, and/or a radiometer. In an example implementation, the circuit 530 may be able to predict future atmospheric (e.g., based on current and/or past measured atmospheric attenuation) and schedule parameter configurations accordingly.

The link control circuit 532 is operable to control parameters of the microwave backhaul link(s) 518 based on the current and/or predicted atmospheric attenuation determined by the circuit 530. In this manner, rather than the microwave backhaul link always being configured for worst-case conditions, the link(s) 518 can handle worst-case conditions during the 0.0001% (e.g.,) of the time when they occur, but can offer higher performance (e.g., higher reliability, higher throughput, lower latency, and/or the like) the rest of the time.

In another example implementation, the parameters may comprise number of concurrently-active links 518. An example of this is described below with reference to FIGS. 6A-6C.

In an example implementation, the parameters may comprise bandwidth of the microwave backhaul link(s) 518. An example of this is described below with reference to FIGS. 7A-7C.

In another example implementation, the parameters may comprise duty cycle of the microwave backhaul link(s) 518. An example of this is described below with reference to FIG. 8.

Figure 6A:
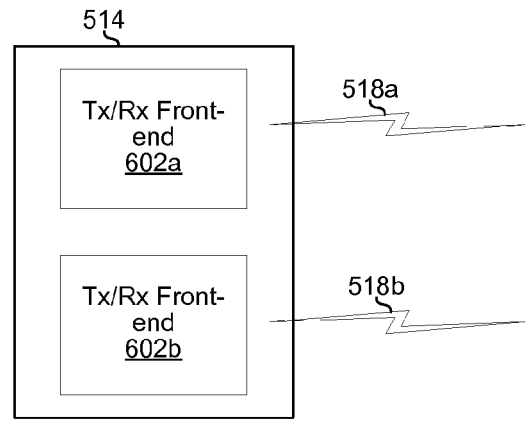
FIG. 6A depicts an example implementation of microwave backhaul transceiver operable to support multiple concurrent links.

FIG. 6A depicts an example implementation of microwave backhaul transceiver operable to support multiple concurrent links. The example circuit 526 in FIG. 6A comprises two Tx/Rx front ends 206A and 206B which may enable two concurrent backhaul links (labeled 518a and 518b). In an example implementation, the first front-end 206A may be used for communicating at a first microwave frequency (e.g., 70 to 95 GHz) and the second front-end 206B may be used communicating at a second, lower frequency that is less susceptible to rain fade or other conditions that may negatively impact communications on the first frequency. For example, the second radio may also be a microwave radio but may communicate at lower frequency such as 30 to 50 GHz. As another example, the second radio may communicate at cellular frequencies.

In an example implementation, a primary, high-bandwidth high(er)-frequency backhaul link 518a (e.g., 5 GHz wide at 70 GHz and/or 5 GHz at 80 GHz) may provide very high reliability and throughput in clear weather conditions, but reliability and throughput may degrade rapidly with rain, fog, etc. Accordingly, a second link 518b between hat may be less susceptible to weather conditions (e.g., because it is at a lower frequency) may be used to improve throughput/reliability of communications between the two towers in poor weather conditions (and/or at other times where the throughput/reliability of the primary link is degraded). The second link (e.g., at a lower frequency less susceptible to atmospheric attenuation) may be enabled and disabled based on current and/or predicted atmospheric attenuation. In an example implementation, while performance of the primary link is degraded, the secondary link 518b may be used for transmitting high priority traffic (e.g., frame headers, FEC syndrome, most significant bits of data words, and/or the like) while the remaining traffic is provided best-effort service on the primary link 518a. Data transmitted over the secondary link may be used for recovering (e.g., error detecting and correcting) data received over the primary link.

Figure 6B:
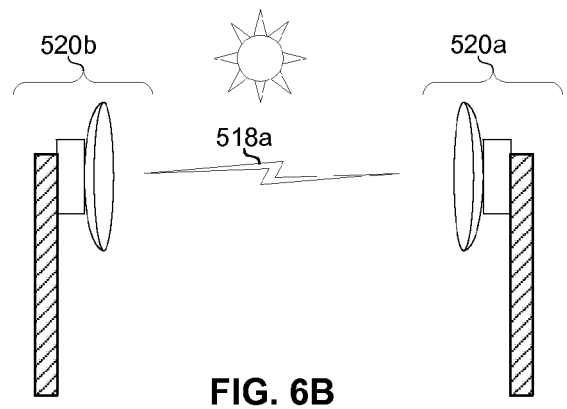
FIGS. 6B and 6C illustrate adaptation of a number of backhaul links between a pair of microwave backhaul nodes.
Figure 6C:
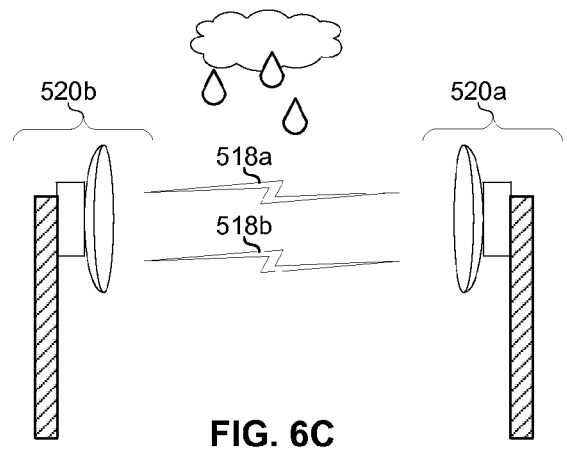

As shown in FIGS. 6B and 6C, when conditions are favorable for the first link 518a (e.g., clear skies), the backhaul nodes 520a and 520b may communicate via only the first link, but when conditions are such that performance of the first link is degraded below a threshold (e.g., rain resulting in atmospheric attenuation rising above a threshold, SNR of the link 518a falling below a threshold, BER of the link 518a rising above a threshold, and/or the like) then the second link 518b may be enabled and used for communicating high-priority traffic.

In an example implementation, the microwave backhaul nodes 520a and 520b may be operable to trade off bandwidth of the link(s) 518 on one hand with range and/or reliability of the link(s) 518 on the other hand. For example, while the link(s) 518 are active, the bandwidth may adapt along with changes in the atmospheric attenuation. For example, as atmospheric attenuation increases (e.g., as rain or snow gets heavier) the bandwidth of the link(s) 518 may increase in order to achieve longer range and/or higher reliability at the expense of decreased spectral efficiency. Conversely, as atmospheric attenuation decreases (e.g., as rain or snow gets lighter) the bandwidth of the link(s) 518 may be decreased (and spectral efficiency increased).

It can be shown that capacity=BW*Log 2(1+SNR). Thus, for a low or negative (in dB) SNR link 518, there may be an optimal capacity around an SNR of −5 dB to −10 dB, for example. Accordingly, where there is excess bandwidth available, the transceivers 514a and 514b may be configured to sacrifice some of the bandwidth (e.g., by increasing FEC code length) in order to increase capacity. Such adjustment of link parameters to sacrifice BW in exchange for increased capacity may be dynamically enabled as needed (e.g., during heavy rain or fog). In addition to increasing redundancy or FEC code length, another way in which the transceivers 514a and 514b may be configurable to adjust BW to optimize capacity is to use spread-spectrum techniques. Accordingly, in an example implementation, the use of spread spectrum techniques by the transceivers 514a and 514b for the microwave backhaul links 518 may be dynamically enabled as needed (e.g., when atmospheric absorption is high due to heavy rain or fog).

Figure 7A:
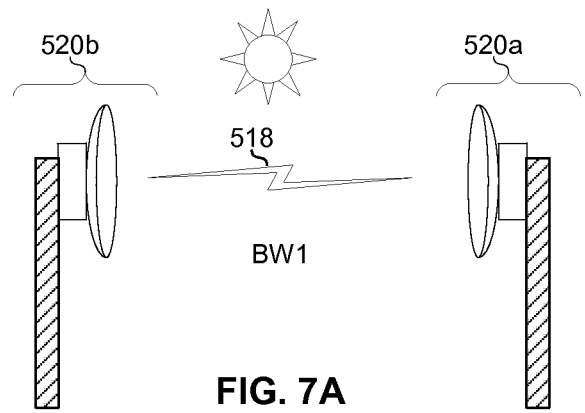
FIGS. 7A and 7B illustrate adaptation of backhaul link bandwidth.
Figure 7B:
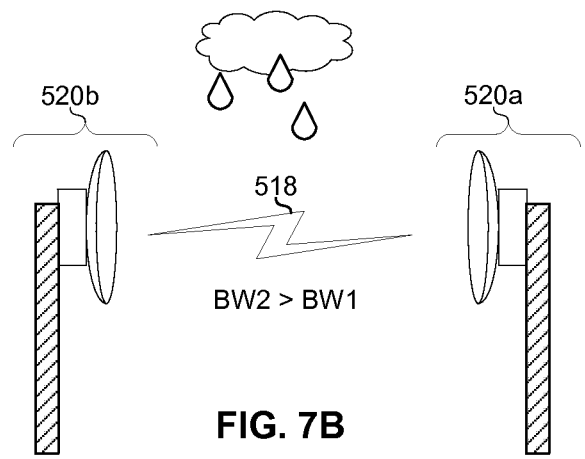
Figure 7C:
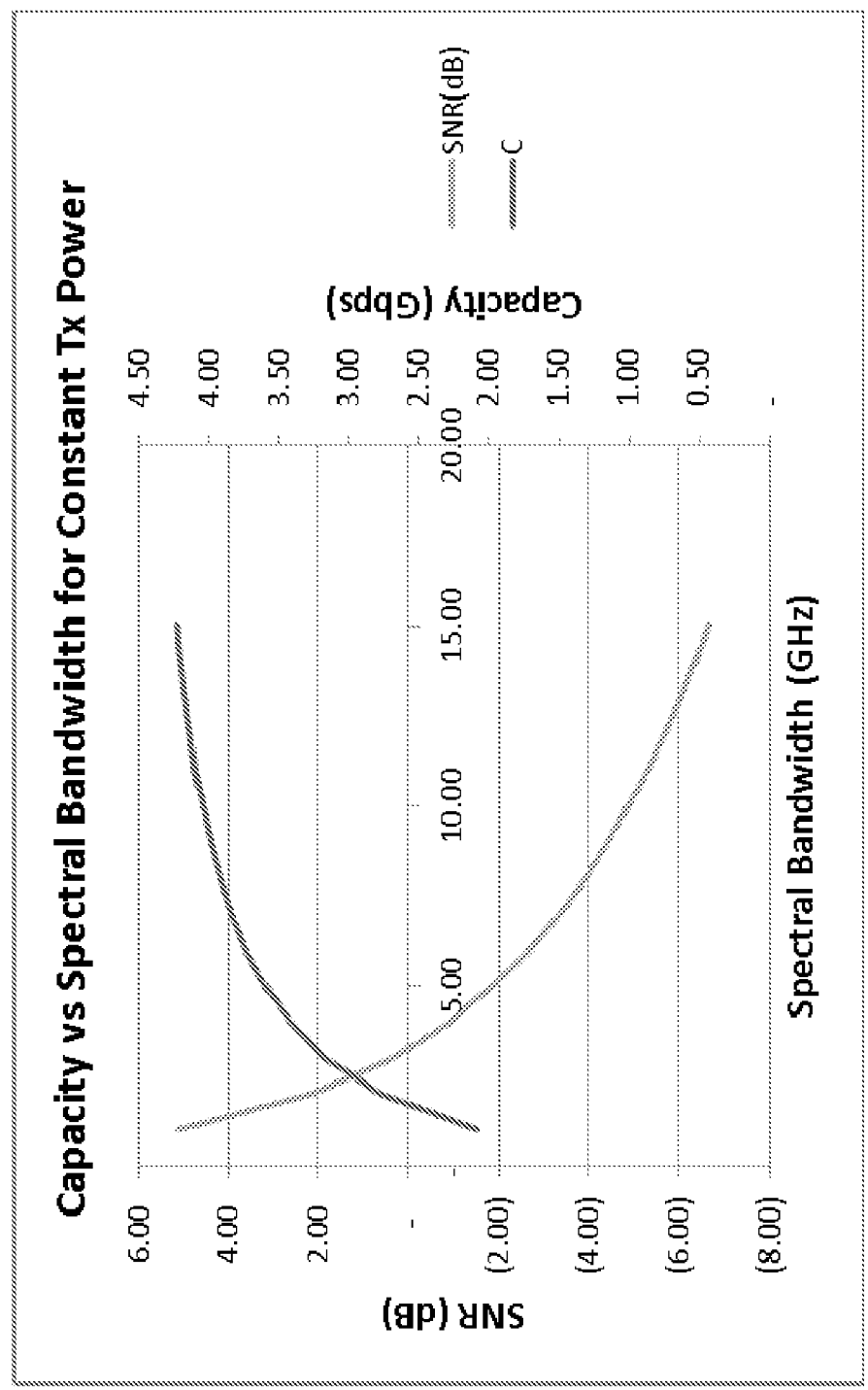
FIG. 7C depicts a tradeoff between bandwidth and capacity for an example backhaul link.

Referring to FIGS. 7B and 7B, there is shown a link between two microwave units which in good signal conditions (FIG. 7A) uses a first bandwidth, BW1, and in poor signal conditions (FIG. 7B) uses a second bandwidth, BW2, which is greater than BW1.

Figure 8:
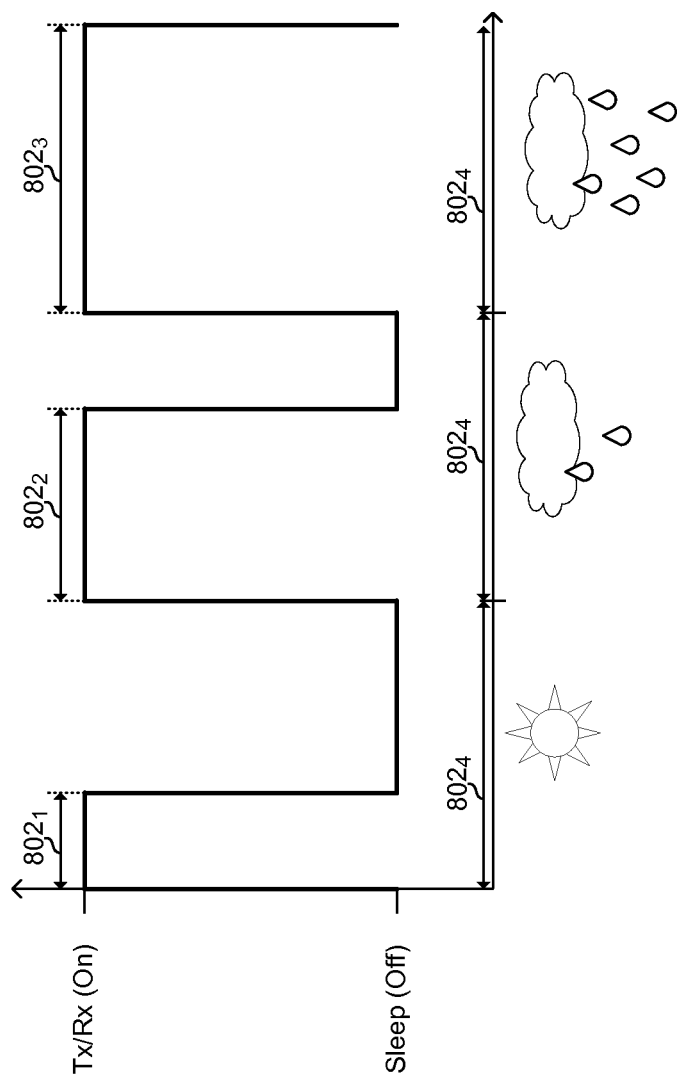
FIG. 8 illustrates adaptive duty cycling of a microwave backhaul link.

FIG. 8 illustrates adaptive duty cycling of a microwave backhaul link. In an example implementation, one or more microwave backhaul links 518 may be duty cycled between a first state and a second state. In an example implementation, the first state is an active state and the second state is an inactive state. In such an implementation, circuitry of the transceivers 514a and 514b may be powered down while in the second state, resulting in reduced power consumption. In other implementations, circuitry of transceivers 514a and 514b may be cycled among more than two states. For example, the circuitry may be duty cycled between three states: (1) active; (2) ready to become active after a setup time of X seconds or less; (3) ready to become active only after longer than X seconds of setup.

An example of a two-state duty cycle is shown in FIG. 8. Specifically, example duty cycles are shown for three types of conditions corresponding to three levels of atmospheric attenuation for the microwave backhaul link 518. In FIG. 8, $802_1 < 802_2 < 802_3$. When atmospheric attenuation is low (e.g., clear skies, low smog, etc.), thus enabling high throughput, the link is active for time $802_1$ and inactive for time $802_4$ minus $802_1$. When atmospheric attenuation is moderate (e.g., light rain or smog), thus enabling moderate throughput, the link is active for time $802_1$ and inactive for time $802_4$ minus $802_2$. When atmospheric attenuation is high (e.g., heavy rain or fog), enabling only low throughput, the link is active for time $802_4$ (i.e., always active). In the example of FIG. 8, for each duty cycle, the same amount of data is communicated over the link 518 during an amount of time $802_4$. Different among the three duty cycles is the amount of power consumed in delivering that data and perhaps latency of the data. Thus, in response to increases in atmospheric attenuation (which corresponds to moving from left to right in FIG. 8), the link control circuits 532 of the transceivers 514a and 514b may increase the duty cycle of circuitry of the transceiver 514a and 514b. Conversely, in response to decreases in atmospheric attenuation (which corresponds to moving from right to left in FIG. 8), the link control circuits 532 of the transceivers 514a and 514b may decrease the duty cycle of circuitry of the transceiver 514a and 514b.

Figure 9A:
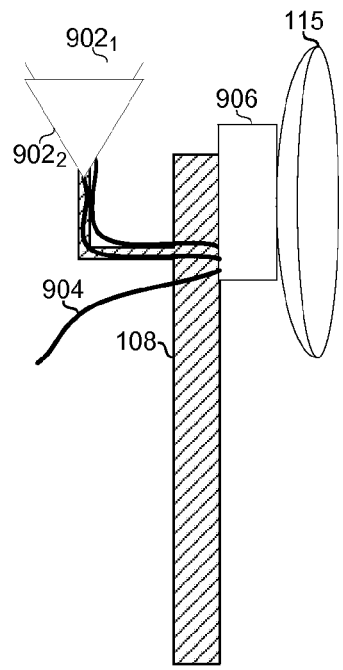
FIGS. 9A and 9B illustrate a microwave backhaul node operable to backhaul a plurality of integrated transceivers.
Figure 9B:
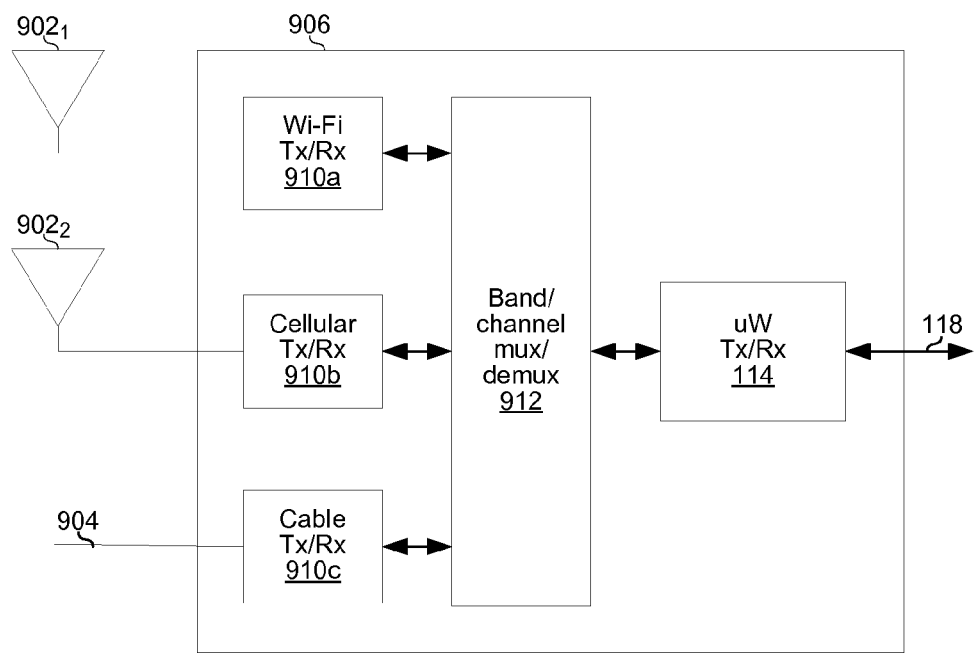

FIGS. 9A and 9B illustrate a microwave backhaul node operable to backhaul traffic of a plurality of integrated transceivers. Shown is a microwave backhaul node 520 similar to the ones discussed above, but additionally comprising antennas $902_1$ and $902_2$, additionally being connected to cable 904, and additionally comprising a subassembly 906 that additionally comprises a Wi-Fi transceiver 910a, a cellular transceiver 910b, a cable transceiver 910c, and multiplexing/demultiplexing circuit 912.

The Wi-Fi transceiver 910a comprises circuitry operable to transmit and receive Wi-Fi signals via the antenna $902_1$. Data to be transmitted may be received via the backhaul link(s) 518, the transceiver 514, and the mux/demux 912. Received data may be output onto the link(s) 518 via the mux/demux 912 and transceiver 514.

The cellular transceiver 910b comprises circuitry operable to transmit and receive cellular (e.g., LTE) signals via the antenna $902_2$. Data to be transmitted may be received via the backhaul link(s) 518, the transceiver 514, and the mux/demux 912. Received data may be output onto the link(s) 518 via the mux/demux 912 and transceiver 514.

The cable transceiver 910a comprises circuitry operable to transmit and receive cable television and/or DOCSIS signals via the cable 904. Data to be transmitted may be received via the backhaul link(s) 518, the transceiver 514, and the mux/demux 912. Received data may be output onto the link(s) 518 via the mux/demux 912 and transceiver 514.

The mux/demux 912 comprises circuitry operable to multiplex the signals from the various transceivers 910 onto the link 518 and demultiplex data from the link(s) 518 to the various transceivers 910. In this manner, signals of a variety of networks using a variety of protocols/standards and operating on a variety of frequencies (e.g., the Wi-Fi may operate on the 3.4 GHz band, the cellular may operate on one or more of the many licensed bands used for cellular, and the cable network may operate on frequencies from 50 MHz to 1 GHz) may be backhauled via one or more microwave backhaul links 518

Wi-Fi, cellular, and cable are merely examples of types of transceivers which may be integrated along with microwave backhaul transceiver 514. In general, any number and/or type of transceivers may be integrated with the microwave backhaul transceiver 514 and backhauled via the link(s) 518.

In accordance with an example implementation of this disclosure, a microwave backhaul transceiver (e.g., 514a) comprises a conditions determination circuit (e.g., 530) operable to determine atmospheric attenuation between the microwave backhaul transceiver and a link partner (e.g., 514b) with which the microwave backhaul transceiver communicates over one or more microwave links (e.g., 518). The transceiver may comprise link control circuit (e.g., 532) operable to control parameters of the one or more microwave links based on the determined atmospheric attenuation. The parameters of the one or more microwave links may comprise, for example, bandwidth (i.e., amount of spectrum used for the links). The link control circuit may, dynamically while the one or more microwave links is active, increase the bandwidth of the one or more microwave links in response to an increase in the determined atmospheric attenuation and decrease the bandwidth of the one or more microwave links in response to a decrease in the atmospheric attenuation. The parameters of the one or more microwave links may comprise how many of the one or more microwave links that are active. The link control circuit may, dynamically while the one or more microwave links is active, disable a secondary link of the one or more microwave links in response to the determined atmospheric attenuation falling below a determined threshold and enable the secondary link of the one or more microwave links in response to the determined atmospheric attenuation rising above the determined threshold. The parameters may comprise a duty cycle of the one or more microwave links. The link control circuit may, dynamically while the one or more microwave links is active, decrease the duty cycle in response to a decrease in the determined atmospheric attenuation and increase the duty cycle in response to an increase in the determined atmospheric attenuation. The conditions determination circuit may communicate over a network (e.g., the Internet) with a weather service to obtain data (e.g., precipitation forecast, humidity forecast, smog forecast, etc.); and use the obtained data for the determination of the atmospheric attenuation. The link control circuit may, dynamically while the one or more microwave links is active, decrease a transmit power used for the one or more microwave links in response to a decrease in the determined atmospheric attenuation and increase the transmit power in response to an increase in the atmospheric attenuation.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
performing by circuitry of an electronics communications network:
determining performance of a microwave backhaul link between a first microwave backhaul transceiver and a second microwave backhaul transceiver, wherein said microwave backhaul link backhauls traffic of a mobile access link;
in response to detecting a degradation of said performance of said microwave backhaul link, adjusting one or more signaling parameters used for said mobile access link resulting in an increased received signal-to-noise ratio (SNR) of said mobile access link; and
in response to detecting an improvement of said performance of said microwave backhaul link, adjusting said one or more signaling parameters used for said mobile access link resulting in a decreased received SNR of said mobile access link.

2. The method of claim 1, comprising:
in response to said detecting said degradation of said performance of said microwave backhaul link, decreasing a number of bits per sample used for transmitting common public radio interface (CPRI) data over said microwave backhaul link; and
in response to said detecting said improvement of said performance of said microwave backhaul link, increasing a number of bits per sample used for transmitting common public radio interface (CPRI) data over said microwave backhaul link.

3. The method of claim 2, comprising
in response to said detecting said degradation of said performance of said microwave backhaul link, decreasing a code rate of said CPRI data; and
in response to said detecting said improvement of said performance of said microwave backhaul link, increasing said code rate of said CPRI data.

4. The method of claim 3, wherein:
said determining said performance comprises determining atmospheric attenuation impacting said microwave backhaul link; and
said determining said atmospheric attenuation is based on direct measurement of said atmospheric attenuation by said circuitry of said communications network and/or based on data received from a weather service accessible via said communications network.

5. The method of claim 1, wherein said determining said performance comprises determining a signal-to-noise ratio of said microwave backhaul link.

6. The method of claim 1, wherein said signaling parameters used for said mobile access link comprise one or more of:
power transmitted by a remote radio head that handles said mobile access link;
order and/or type of modulation used for said mobile access link; and
type and/or code rate of forward error correction used for said mobile access link.

7. The method of claim 1, comprising performing by said circuitry:
receiving an analog mobile access link signal from a remote radio head that handles said mobile access link;
sampling said mobile access link signal to generate a digitized mobile access link signal; and
sending said digitized mobile access link signal to a baseband unit via said microwave backhaul link, wherein said baseband unit is operable to demodulate said mobile access link signal.

8. The method of claim 7, comprising performing by said circuitry:
decreasing a resolution and/or rate of said sampling in response to said detecting said degradation of said performance of said microwave backhaul link; and
increasing said resolution and/or rate of said sampling in response to said detecting said improvement of said performance of said microwave backhaul link.

9. A system comprising:
performance determination circuitry operable to determine performance of a microwave backhaul link between a first microwave backhaul transceiver and a second microwave backhaul transceiver, wherein said microwave backhaul link is a backhaul for traffic of a mobile access link; and
link control circuitry operable to:
in response to an indication from said performance determination circuitry that said performance of said microwave backhaul link has degraded, adjust one or more signaling parameters used for said mobile access link, said adjustment resulting in an increased received signal-to-noise ratio (SNR) of said mobile access link; and
in response to an indication from said performance determination circuitry that said performance of said microwave backhaul link has improved, adjust said one or more signaling parameters used for said mobile access link, said adjustment resulting in an increased received signal-to-noise ratio (SNR) of said mobile access link.

10. The system of claim 9, wherein said link control circuitry is operable to:
- in response to said indication from said performance determination circuitry that said performance of said microwave backhaul link has degraded, decrease a number of bits per sample used for transmission of common public radio interface (CPRI) data over said microwave backhaul link; and
- in response to said indication from said performance determination circuitry that said performance of said microwave backhaul link has improved, increase a number of bits per sample used for transmitting common public radio interface (CPRI) data over said microwave backhaul link.

11. The system of claim 10, wherein said link control circuitry is operable to:
- in response to said indication from said performance determination circuitry that said performance of said microwave backhaul link has degraded, decrease a code rate of said CPRI data; and
- in response to said indication from said performance determination circuitry that said performance of said microwave backhaul link has improved, increase a code rate of said CPRI data.

12. The system of claim 9, wherein:
- said determination of said performance comprises a determination of atmospheric attenuation impacting said microwave backhaul link;
- said performance determination circuitry is operable to determine said atmospheric attenuation based on data received from a weather service accessible via a communications network and/or based on direct measurement of said atmospheric attenuation by circuitry of said communications network.

13. The system of claim 9, wherein said determination of said performance comprises a determination of signal-to-noise ratio of said microwave backhaul link.

14. The system of claim 9, wherein said signaling parameters used for said mobile access link comprise one or more of:
- power transmitted by a remote radio head that handles said mobile access link;
- order and/or type of modulation used for said mobile access link; and
- type and/or code rate of forward error correction used for said mobile access link.

15. The system of claim 9, comprising:
interface circuitry that is operable to:
- receive an analog mobile access link signal from a remote radio head that handles said mobile access link; and
- sample said analog mobile access link signal to generate a digitized mobile access link signal; and
microwave backhaul transceiver circuitry operable to send said digitized mobile access link signal over said microwave backhaul link.

16. The system of claim 15, comprising microwave backhaul transceiver circuitry operable to:
- receive said digitized mobile access link signal over said microwave backhaul link;
- convert said digitized mobile access link signal back to said analog mobile access link signal; and
- convey said analog mobile access signal to a baseband unit, wherein said baseband unit is operable to demodulate said mobile access link signal.

17. The system of claim 15, wherein said interface circuitry is operable to:
- decrease a sampling resolution and/or sampling rate of said interface circuitry in response to said indication from said performance determination circuitry that said performance of said microwave backhaul link has degraded; and
- increase said resolution and/or rate of said sampling in response to said indication from said performance determination circuitry that said performance of said microwave backhaul link has improved.

* * * * *